US012572554B2

(12) United States Patent 　(10) Patent No.: US 12,572,554 B2
Beharie et al. 　(45) Date of Patent: Mar. 10, 2026

(54) SYSTEMS, METHODS, AND COMPUTER READABLE MEDIA FOR DATA AUGMENTATION

(71) Applicant: ODAIA Intelligence Inc., Toronto (CA)

(72) Inventors: Zak Beharie, Oakville (CA); Zhi Fei Zou, Mississauga (CA); Matthieu Marie Emmanuel Buot de l'Epine, Paris (FR)

(73) Assignee: ODAIA Intelligence Inc., Toronto (CA)

( * ) Notice: Subject to any disclaimer, the term of this patent is extended or adjusted under 35 U.S.C. 154(b) by 331 days.

(21) Appl. No.: 17/344,645

(22) Filed: Jun. 10, 2021

(65) Prior Publication Data

US 2022/0398268 A1 　Dec. 15, 2022

(51) Int. Cl.
　*G06F 16/2458* 　(2019.01)
　*G06F 16/215* 　(2019.01)
　*G06F 18/2135* 　(2023.01)
　*G06F 18/22* 　(2023.01)
　*G06N 3/04* 　(2023.01)
(52) U.S. Cl.
　CPC ........ *G06F 16/2462* (2019.01); *G06F 16/215* (2019.01); *G06F 18/21355* (2023.01); *G06F 18/22* (2023.01); *G06N 3/04* (2013.01)
(58) Field of Classification Search
　CPC ........................... G06F 16/2462; G06F 16/215
　See application file for complete search history.

(56) References Cited

U.S. PATENT DOCUMENTS

| | | |
|---|---|---|
| 8,396,824 B2 | 3/2013 | Au |
| 8,862,534 B1 | 10/2014 | Faratin et al. |
| 10,303,703 B2 | 5/2019 | Meierhoefer et al. |

(Continued)

FOREIGN PATENT DOCUMENTS

CN 　112800782 A 　* 　5/2021 　.......... G06F 40/126

OTHER PUBLICATIONS

Ali, A simple Word2vec tutorial, Jan. 6, 2019, Medium, pp. 1-27, https://medium.com/@zafaralibagh6/a-simple-word2vec-tutorial-61e64e38a6a1, retrieved Sep. 5, 2023 (Year: 2019).*

(Continued)

*Primary Examiner* — Etienne P Leroux
*Assistant Examiner* — Dara J Glasser
(74) *Attorney, Agent, or Firm* — SMART & BIGGAR LP; Isis E. Caulder; Robert Baker

(57) ABSTRACT

Systems, methods, and computer readable media for data augmentation are described. The system comprises a network device, a memory comprising a data augmentation model and a plurality of seed entries, and a processor in communication with the network device and the memory. The processor is configured to receive a candidate data item in a second data set, generate a candidate seed corresponding to the candidate data item, and determine a data feature, based on the data augmentation model, for the candidate seed. Additionally, the processor is configured to generate at least one matching seed in the plurality of seed entries, the at least one matching seed based on the data feature. The processor is further configured to augment the candidate data item with data corresponding to the at least one matching seed.

20 Claims, 11 Drawing Sheets

(56) References Cited

U.S. PATENT DOCUMENTS

| | | | |
|---|---|---|---|
| 2006/0112050 A1* | 5/2006 | Miikkulainen | G16H 50/20 |
| | | | 706/46 |
| 2017/0337486 A1 | 11/2017 | Zang et al. | |
| 2018/0025045 A1* | 1/2018 | Kirti | G06Q 50/01 |
| | | | 707/690 |
| 2019/0018897 A1* | 1/2019 | Iannaccone | G06F 16/24578 |
| 2020/0104408 A1* | 4/2020 | Salomon | G06F 16/285 |
| 2020/0242634 A1* | 7/2020 | Pogrebezky | G06F 16/951 |
| 2020/0320571 A1* | 10/2020 | Singh | G06N 20/00 |
| 2021/0142233 A1* | 5/2021 | Masood | G06N 3/088 |
| 2021/0150541 A1* | 5/2021 | Gurbuxani | G06Q 30/0242 |
| 2022/0377257 A1* | 11/2022 | Wilson | G06N 20/00 |

OTHER PUBLICATIONS

Zhou et al., Machine Translation of CN 112800782, dated May 14, 2021 (Year: 2021).*
International Search Report and Written Opinion mailed Aug. 31, 2022 in International Patent Application No. PCT/CA2022/050905 (9 pages).

* cited by examiner

106

| | |
|---|---|
| Communication Unit | Display |
| 204 | 206 |

Processor Unit

Memory Unit 208     210

| I/O Unit | User Interface Engine | Power Unit |
|---|---|---|
| 212 | 214 | 216 |

| | |
|---|---|
| 220 | Operating system |
| 222 | Programs |
| | Database |
| 224 | Model Generation Engine |
| 226 | Matching Engine |
| 228 | |
| 230 | Neural Network |
| 232 | Data Augmentation Engine |
| 234 | Seed Generation Engine |
| 236 | Report Generation Engine |

| User ID | First Name | Last Name | Location |
|---------|-----------|-----------|----------|
| 00001 | John | Smith | M2S |

402

| User ID | First Name | Last Name | Location | Gender | Ethnicity |
|---------|-----------|-----------|----------|--------|-----------|
| 00001 | John | Smith | M2S | Male | Caucasian |

408    404    406

| Seed Identifier | Matching Seeds |
|-----------------|----------------|
| 08943ab4923fbc8032 | 1289abdf7934ea674b |
| | 45792b974f97a97c79 |
| | 3ab080843fd8084c48 |
| | 2083bf97a76d97f797 |
| | 879bc9696a96e976ff |
| | 9797b96f96ed99c69d |
| | 09668a96b969e96d9f |
| | 8698a97f99e779c96 |
| | 685869b9c6199d9e9 |

410    412

Figures 4D, 4E:
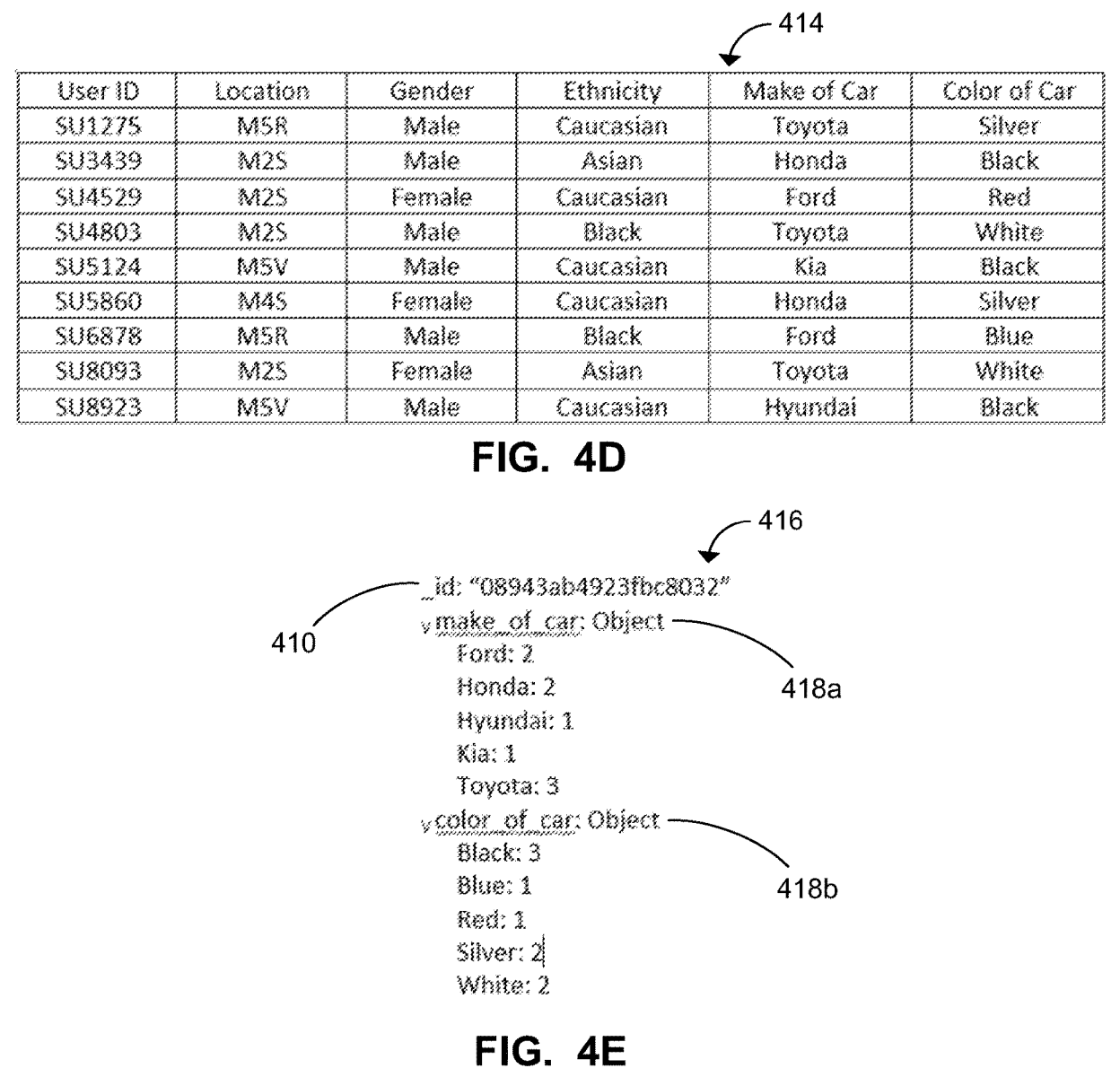

| User ID | Location | Gender | Ethnicity | Make of Car | Color of Car |
|---------|----------|--------|-----------|-------------|--------------|
| SU1275 | M5R | Male | Caucasian | Toyota | Silver |
| SU3439 | M2S | Male | Asian | Honda | Black |
| SU4529 | M2S | Female | Caucasian | Ford | Red |
| SU4803 | M2S | Male | Black | Toyota | White |
| SU5124 | M5V | Male | Caucasian | Kia | Black |
| SU5860 | M4S | Female | Caucasian | Honda | Silver |
| SU6878 | M5R | Male | Black | Ford | Blue |
| SU8093 | M2S | Female | Asian | Toyota | White |
| SU8923 | M5V | Male | Caucasian | Hyundai | Black |

```
_id: "08943ab4923fbc8032"
v make_of_car: Object
    Ford: 2
    Honda: 2
    Hyundai: 1
    Kia: 1
    Toyota: 3
v color_of_car: Object
    Black: 3
    Blue: 1
    Red: 1
    Silver: 2
    White: 2
```

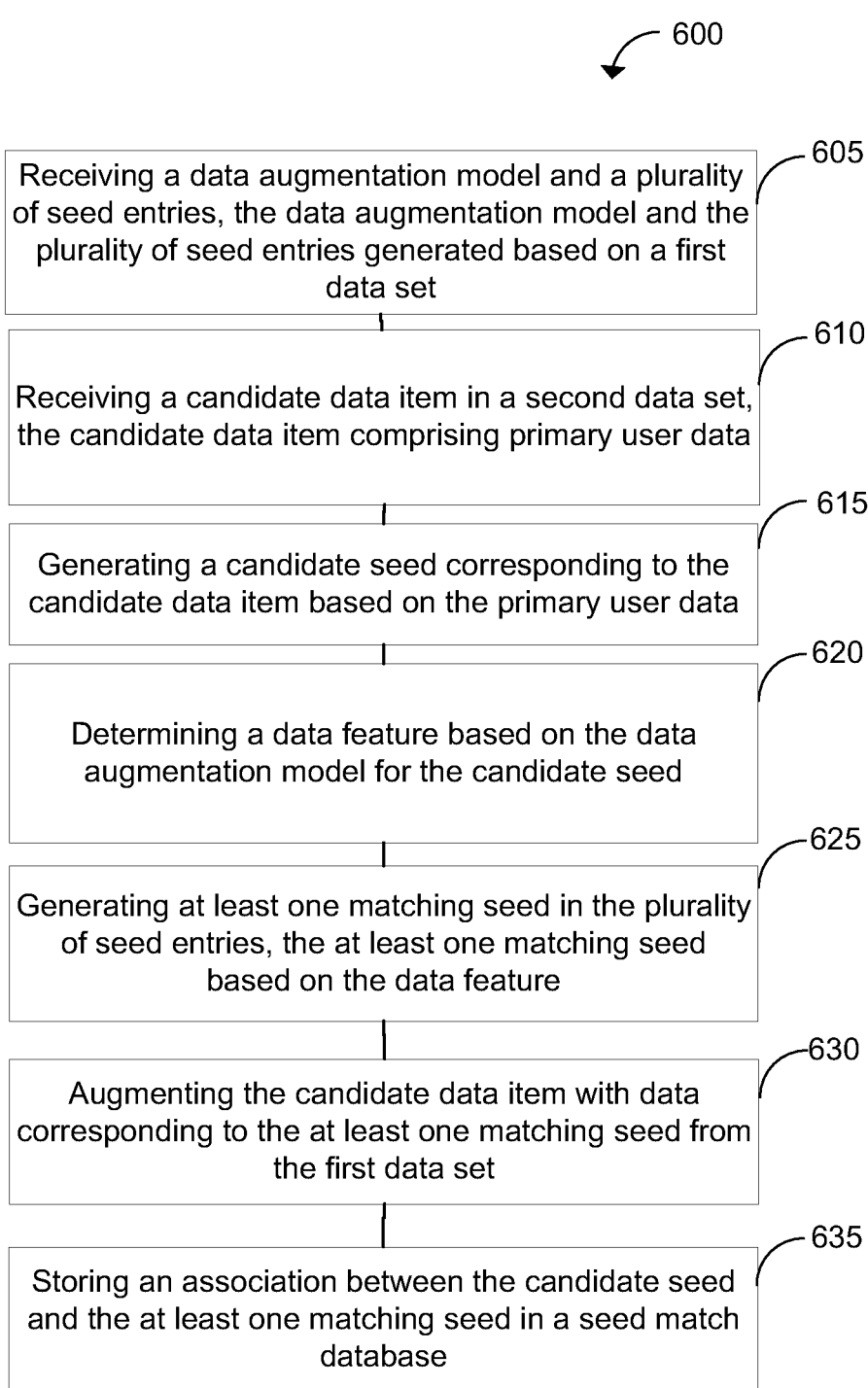

600

605
Receiving a data augmentation model and a plurality of seed entries, the data augmentation model and the plurality of seed entries generated based on a first data set 610
Receiving a candidate data item in a second data set, the candidate data item comprising primary user data 615
Generating a candidate seed corresponding to the candidate data item based on the primary user data 620
Determining a data feature based on the data augmentation model for the candidate seed 625
Generating at least one matching seed in the plurality of seed entries, the at least one matching seed based on the data feature 630
Augmenting the candidate data item with data corresponding to the at least one matching seed from the first data set 635
Storing an association between the candidate seed and the at least one matching seed in a seed match database

FIG. 6

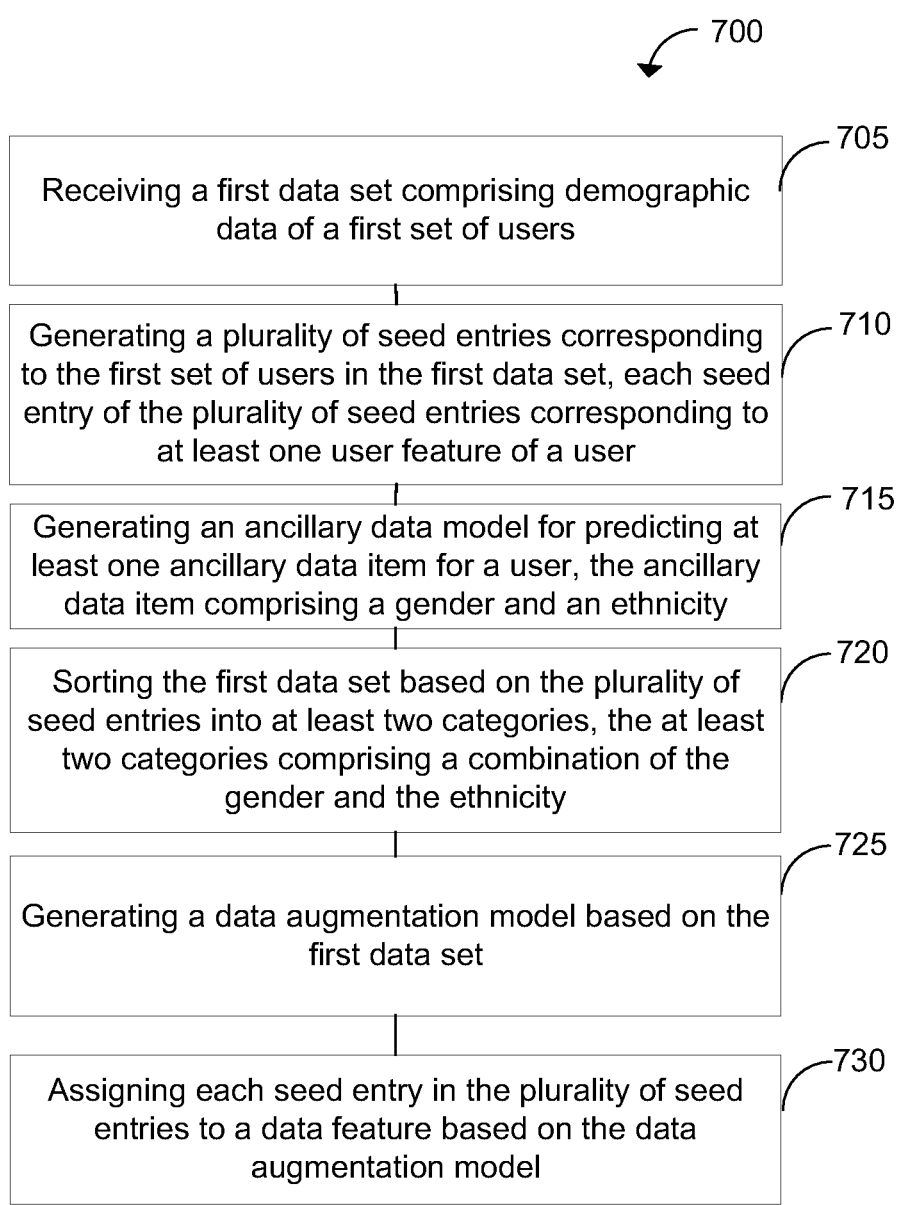

700

705
Receiving a first data set comprising demographic data of a first set of users 710
Generating a plurality of seed entries corresponding to the first set of users in the first data set, each seed entry of the plurality of seed entries corresponding to at least one user feature of a user 715
Generating an ancillary data model for predicting at least one ancillary data item for a user, the ancillary data item comprising a gender and an ethnicity 720
Sorting the first data set based on the plurality of seed entries into at least two categories, the at least two categories comprising a combination of the gender and the ethnicity 725
Generating a data augmentation model based on the first data set 730
Assigning each seed entry in the plurality of seed entries to a data feature based on the data augmentation model

FIG. 7

SYSTEMS, METHODS, AND COMPUTER READABLE MEDIA FOR DATA AUGMENTATION

FIELD

The described embodiments relate generally to a system and method for improving database functionality by using data augmentation, and specifically to receiving a candidate data item in a data set and augmenting the candidate data item with data corresponding to matching seed entries in a different data set.

BACKGROUND

An entity such as a web platform operator, including for example, an e-commerce platform operator, may have limited access to robust information about users registered on the platform.

This lack of robust information is further compounded by challenges the platform operator may face with handling of personal information including personally identifiable information. The platform operator may want to avoid directly connecting their users on their platform with protected personal information, but may desire the ability to produce more detailed reporting information on their users in an aggregate form. The platform operator may have access to a data set including a limited amount of personal information on their users, and may thus be limited in identifying demographic trends for customers and prospective customers.

An entity may have data available in a first data set for a first set of users. The entity may also have data available in a second data set for a second set of users, where the second data set, compared with the first data set, includes limited information regarding the users. For example, an entity may have customer data available in a customer data set for its customers. However, the information in the customer data set may be limited to first name, last name and location information.

Separately, 3rd party survey datasets may be available that have rich demographic information. This $3^{rd}$ party surveys data sets may include a plurality of survey questions answered by a population and managed by a $3^{rd}$ party. The questions comprising the survey data may change and may be contextual in nature (i.e., do you own a car, if so, what color, make, model).

It may be advantageous for the entity to have demographic or behavior data available for its customers to better tailor its products and services. Such demographic or user behavior data may be available in survey response data for a survey conducted by the $3^{rd}$ party.

One challenge that the entity often faces, however, is that there may not be many matches between its customers and the responders to the survey. Therefore, the entity may be limited in its ability to identify demographic trends for customers and prospective customers.

The platform operator's data set and the $3^{rd}$ party data set may be heterogenous, and may lack a common identifier, that is, no single common identifier exists which links a user in the operator's data set with the $3^{rd}$ party data set.

SUMMARY

In a first aspect, there is provided a computer-implemented method for data augmentation. The method comprises receiving a data augmentation model and a plurality of seed entries, the data augmentation model and the plurality of seed entries generated based on a first data set. The method further comprises receiving a candidate data item in a second data set, the candidate data item comprising primary user data. Additionally, the method comprises generating a candidate seed corresponding to the candidate data item based on the primary user data. The method further comprises determining a data feature based on the data augmentation model for the candidate seed and generating at least one matching seed in the plurality of seed entries, the at least one matching seed based on the data feature. Additionally, the method comprises augmenting the candidate data item with data corresponding to the at least one matching seed from the first data set; and storing an association between the candidate seed and the at least one matching seed in a seed match database.

In one or more embodiments, the method may further comprise receiving an ancillary data model; generating ancillary user data for the candidate data item based on the primary user data and the ancillary data model; and generating the candidate seed further based on the ancillary user data.

In one or more embodiments, the primary user data may comprise at least one selected from the group of a first name, a last name and location data; and the ancillary user data may comprise at least one selected from the group of ethnicity data and gender data.

In one or more embodiments, the method may further comprise generating one or more reports based on the augmented candidate data item.

In one or more embodiments, the at least one matching seed in the plurality of seed entries may be generated based on a hamming distance between the ancillary user data of the candidate data item and ancillary user data for the plurality of seed entries; and a cosine distance between the generated data feature and the data features for the plurality of seed entries.

In one or more embodiments, augmenting the candidate data item may further comprise augmenting the candidate data item with a weighted distribution of data corresponding to the at least one matching seed in the plurality of seed entries.

In one or more embodiments, the plurality of seed entries may further comprise one or more of user behavior data and survey data.

In one or more embodiments, the data augmentation model may comprise a neural network and the data feature may comprise an embedding vector.

In one or more embodiments, generating the at least one matching seed may comprise determining matching scores for the plurality of seed entries and applying a threshold score to generate the at least one matching seed.

In a second aspect, there is provided a system for data augmentation, the system comprising: a network device; a memory comprising: a data augmentation model and a plurality of seed entries; and a processor in communication with the network device and the memory. The processor is configured to receive, via the network device, a candidate data item in a second data set, the candidate data item comprising primary user data. The processor is further configured to generate a candidate seed corresponding to the candidate data item based on the primary user data; and determine a data feature, based on the data augmentation model, for the candidate seed. Additionally, the processor is configured to generate at least one matching seed in the plurality of seed entries, the at least one matching seed based on the data feature. The processor is further configured to augment the candidate data item with data corresponding to the at least one matching seed; and store, in the memory, an association between the candidate seed and the at least one matching seed in a seed match database.

In one or more embodiments, the memory may further comprise an ancillary data model and the processor may be further configured to: generate ancillary user data for the candidate data item based on the primary user data and the ancillary data model; and generate the candidate seed further based on the ancillary user data.

In one or more embodiments, the primary user data may comprise at least one selected from the group of a first name, a last name and location data; and the ancillary user data may comprise at least one selected from the group of ethnicity data and gender data.

In one or more embodiments, the processor may be further configured to generate one or more reports based on the augmented candidate data item.

In one or more embodiments, the processor may be configured to generate the at least one matching seed in the plurality of seed entries based on: a hamming distance between the ancillary user data of the candidate data item and ancillary user data for the plurality of seed entries; and a cosine distance between the generated data feature and the data features for the plurality of seed entries.

In one or more embodiments, the processor may be configured to augment the candidate data item with a weighted distribution of data corresponding to the at least one matching seed in the plurality of seed entries.

In one or more embodiments, the plurality of seed entries may further comprise one or more of user behavior data and survey data.

In one or more embodiments, the data augmentation model may comprise a neural network and the data feature may comprise an embedding vector.

In one or more embodiments, the processor may be configured to generate the at least one matching seed by determining matching scores for the plurality of seed entries and applying a threshold score to generate the at least one matching seed.

In a third aspect, there is provided a method for generating a data augmentation model and a plurality of seed entries. The method comprises receiving a first data set comprising demographic data of a first set of users; and generating a plurality of seed entries corresponding to the first set of users in the first data set, each seed entry of the plurality of seed entries corresponding to at least one user feature of a user. The method further comprises generating an ancillary data model for predicting at least one ancillary data item for a user, the ancillary data item comprising a gender and an ethnicity. Additionally, the method comprises sorting the first data set based on the plurality of seed entries into at least two categories, the at least two categories comprising a combination of the gender and the ethnicity. The method further comprises generating a data augmentation model based on the first data set; and assigning each seed entry in the plurality of seed entries to a data feature based on the data augmentation model.

In one or more embodiments, the data augmentation model may comprise a neural network having an embedding layer and one or more hidden layers.

In one or more embodiments, the data feature may comprise a embedding vector having two or more dimensions.

In one or more embodiments, generating the plurality of seed entries comprises generating an identifier comprising a hash value from the at least one user feature of the user.

In one or more embodiments, the method further comprises storing the data augmentation model, the ancillary model and the plurality of seed entries.

In one or more embodiments, the method further comprises transmitting the data augmentation model, the ancillary model and the plurality of seed entries.

In a fourth aspect, there is provided a system for generating a data augmentation model and a plurality of seed entries. The system comprises: a network device; a memory comprising a first data set comprising demographic data of a first set of users; and a processor in communication with the network device and the memory. The processor is configured to generate a plurality of seed entries corresponding to the first set of users in the first data set, each seed entry of the plurality of seed entries corresponding to at least one user feature of a user. The processor is further configured to generate an ancillary data model for predicting at least one ancillary data item for a user, the ancillary data item comprising a gender and an ethnicity. Additionally, the processor is configured to sort the first data set based on the plurality of seed entries into at least two categories, the at least two categories comprising a combination of the gender and the ethnicity. The processor is further configured to generate a data augmentation model based on the first data set; and assign each seed entry in the plurality of seed entries to a data feature based on the data augmentation model.

In one or more embodiments, the data augmentation model may comprise a neural network having an embedding layer and one or more hidden layers.

In one or more embodiments, the data feature may comprise an embedding vector having two or more dimensions.

In one or more embodiments, the processor may be configured to generate the plurality of seed entries by generating an identifier comprising a hash value from the at least one user feature of the user.

In one or more embodiments, the processor may be further configured to store the data augmentation model, the ancillary model and the plurality of seed entries in the memory.

In one or more embodiments, the processor may be further configured to transmit the data augmentation model, the ancillary model and the plurality of seed entries via a network device.

BRIEF DESCRIPTION OF THE DRAWINGS

A preferred embodiment of the present invention will now be described in detail with reference to the drawings, in which:

FIG. 4D is a table diagram showing user data of the first data set corresponding to the matching seeds of FIG. 4C in accordance with one or more embodiments;

FIG. 4E is a diagram showing augmented data in accordance with one or more embodiments;

FIG. 6 is a method diagram for data augmentation in accordance with one or more embodiments; and FIG. 7 is a method diagram for generating a data augmentation model and a plurality of seed entries in accordance with one or more embodiments.

DESCRIPTION OF EXEMPLARY EMBODIMENTS

Figure 1A:
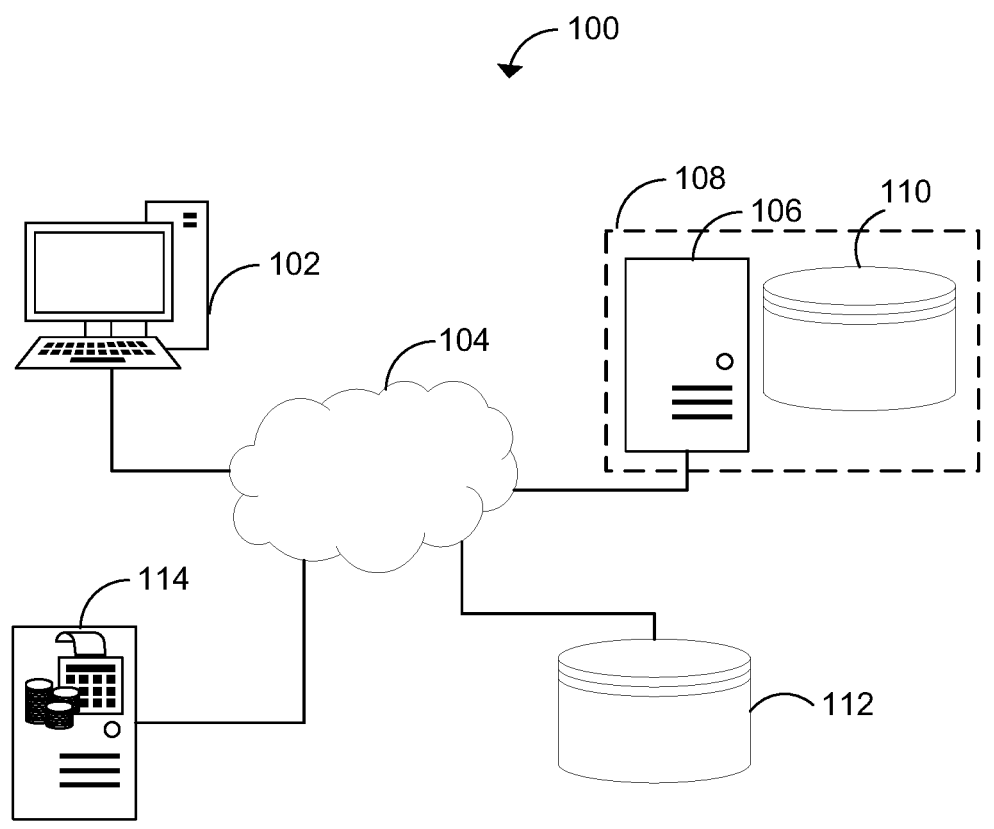
FIG. 1A is a system diagram showing a system for augmenting data in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented such as hardware, software, and combinations thereof.

Program code may be applied to input data to perform the functions described herein and to generate output information. The output information is applied to one or more output devices, in known fashion.

Each program may be implemented in a high level procedural or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

As described herein, the term "real-time" refers to generally real-time feedback from a user device to a user. The term "real-time" herein may include a short processing time, for example 100 ms to 1 second, and the term "real-time" may mean "approximately in real-time" or "near real-time".

The described systems and methods can allow an entity to augment available data with additional information. For example, an entity may have customer data like first name, last name and location, available for its customers. The entity may also have available $3^{rd}$ party survey data that includes demographic and additional user information. The described systems and methods can be used to generate matching users in the $3^{rd}$ party data corresponding to the entity's customers. The available customer data can then be augmented based on the data corresponding to the matching users in the $3^{rd}$ party data. The augmented data can include, for example, demographic data and user behavior data. The described systems and methods can be used to generate reports based on the augmented data that provide demographic and behavioral insights to the entity.

Figure 1B:
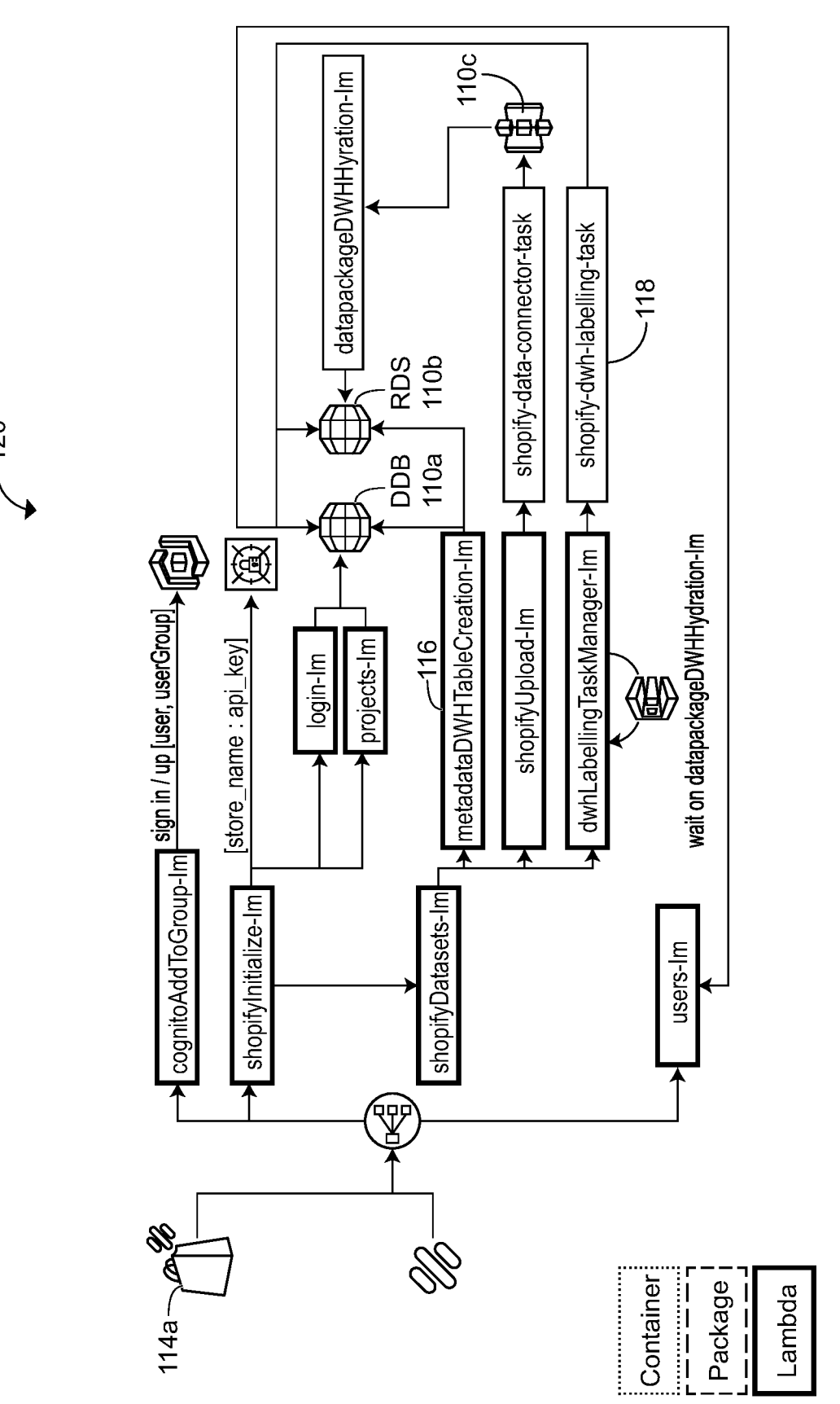
FIG. 1B is a data connector architecture diagram in accordance with one or more embodiments.

Reference is first made to FIGS. 1A and 1B. FIG. 1A shows a system diagram 100 showing a system for augmenting data in accordance with one or more embodiments. The system diagram 100 includes a user device 102, a network 104, a data augmentation service 108, a $3^{rd}$ party data source 112 and a primary user data source 114. The data augmentation service 108 includes a server 106 and one or more databases 110. FIG. 1B shows a data connector architecture diagram 120 in accordance with one or more embodiments. Data connector architecture diagram 120 includes a primary user data source 114a, Amazon® DynamoDB 110a, Amazon® Relational Database Service 110*b*, and intermediate database 110*c*. The primary user data source 114*a* may be Shopify®, or another such e-commerce platform. The primary user data source 114*a* may be a Shopify® account or store. For example, a user of a particular storefront hosted with Shopify® may enable communication with the data augmentation system, and the data from the particular user or storefront may be provided.

Network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The primary user data source 114 may provide a candidate data item in a second data set comprising primary user data to the data augmentation service 108 via network 104. The primary user data source 114 may transmit information to the data augmentation service 108 using an Application Programming Interface (API) which may either push to the service 108 or be pulled by service 108. The format of the data provided using the API at primary user data source 114 may be XML, JSON, or another interchange format as known. The primary user data source 114 may transmit information to the service 108 using a periodic file transfer, for example, using secure File Transfer Protocol (sFTP), in either a push or a pull manner. The primary user data may include customer data of a set of customers or users of a platform such as Shopify®. The primary user data may be from a Shopify® account or store. For example, a user of a particular storefront hosted with Shopify® may enable communication with the data augmentation system, and the primary user data from the particular user or storefront may be provided. In some embodiments, the primary user data comprises features associated with first name, last name and location data of customers. The location data of customers may include forward sortation area (FSA) data, for example, the FSA may be a zip code or a postal code.

While the primary user data source 114 is described herein as providing customer data from an e-commerce platform such as Shopify® (or a user or storefront associated with Shopify®), it is understood that the primary user data source 114 may provide user information from a variety of different platforms where such data is available. This may include Google® Analytics data, data from another e-commerce platform, or data from another platform such as Facebook®, Twitter®, Amazon® Marketplace, etc.

The 3$^{rd}$ party data source 112 may provide a first data set comprising user data to the data augmentation service 108 via network 104. The user data may comprise features associated with survey data, and other related information of a set of users. In some embodiments, there may not be any common members between the customers in the second data set and the users in the first data set. In other embodiments, there may be overlap between the membership in the second data set and the first data set. The survey data may comprise answers to survey questions conducted by a marketing agency. The survey questions may be contextual in nature, for example, a first survey question can be if the survey responder owns a car? If the survey responder answers "Yes" to the first survey question, a second contextual survey question can be regarding the make, model or color of the car. These questions may be very broad, or specific. They may include many different surveyed aspects such as household income, purchase history, consumer preferences including brand preferences, and demographic data. In some embodiments, the user data may include demographic data. For example, the demographic data can include gender and ethnicity data of users. In some embodiments, the user data may include user behaviour data, for example, navigation history of a user on a website, user purchase history, user search history, user geographical history information, etc.

The 3$^{rd}$ party data source 112 may transmit information to the data augmentation service 108 using an Application Programming Interface (API) which may either push to the service 108 or be pulled by service 108. The format of the data provided using the API at 3$^{rd}$ party data source 112 may be XML, JSON, or another interchange format as known. The 3$^{rd}$ party data source 112 may transmit information to the service 108 using a periodic file transfer, for example, using secure File Transfer Protocol (sFTP) in either a push or pull manner.

The 3$^{rd}$ party data source 112 may include a database for storing the first data set. The 3$^{rd}$ party data source 112 may include a Structured Query Language (SQL) database such as PostgreSQL or MySQL or a not only SQL (NoSQL) database such as MongoDB, or Graph Databases, etc.

The user device 102 may be any two-way communication device with capabilities to communicate with other devices. The user device 102 may include, for example, a personal computer, a workstation, a portable computer or a mobile phone device. In some embodiments, the data augmentation service 108 may augment a candidate item in a second data set that is received from data source 114, without the entire second data set being received. In some embodiments, the data augmentation service 108 may augment data in database 110 by batch processing the entire contents of the second data set. The user device 102 may be used by a user to access reports and user interfaces provided by service 108. The user device 102 may access the service 108 using a web browser, or alternatively the user device 102 may have a software application installed that may communicate with an API of service 108 to access reporting information.

The user device 102 may provide a candidate data item for data augmentation to the data augmentation service 108 via network 104. For example, the user at user device 102 may select a customer or user of primary user data source 114 and may request data augmentation and reporting for the candidate data item.

In some embodiments, the candidate data item may correspond to a customer in the second data set. The candidate data item can include primary user data, for example, first name, last name and location.

The databases 110 may include a database for storing the second data set received from the primary user data source 114. In some cases, the candidate data item may be received and augmented without the second data set being stored in database 110. The databases 110 may also include a database for storing the first data set received from the 3$^{rd}$ party data source 112. The databases 110 may include a Structured Query Language (SQL) database such as PostgreSQL or MySQL or a not only SQL (NoSQL) database such as MongoDB, or Graph Databases, etc.

The server 106 may be any networked computing device or system, including a processor and memory, and capable of communicating with a network, such as network 104. The server 106 may include one or more systems or devices that are communicably coupled to each other. The computing device may be a personal computer, a workstation, a server, a portable computer, or a combination of these.

Referring to the data connector architecture diagram 120 shown in FIG. 1B, primary user data comprising Shopify® customer datasets may be provided by the primary user data source Shopify® 114a (or a dataset associated with a Shopify® user or storefront). The received customer data-sets may be stored in the database 110b. The received customer datasets may be stored in the Amazon® DynamoDB 110a and the Amazon® Relational Database Service 110b after corresponding metadata and table cre-ation 116. In some embodiments, the data augmentation service 108 may include labelling 118 the received customer datasets. The labelling 118 may include, for example, data type sub-detection and numeric data binning.

Figure 2A:
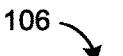
FIG. 2A is a block diagram for a server in accordance with one or more embodiments.
Figure 2A:
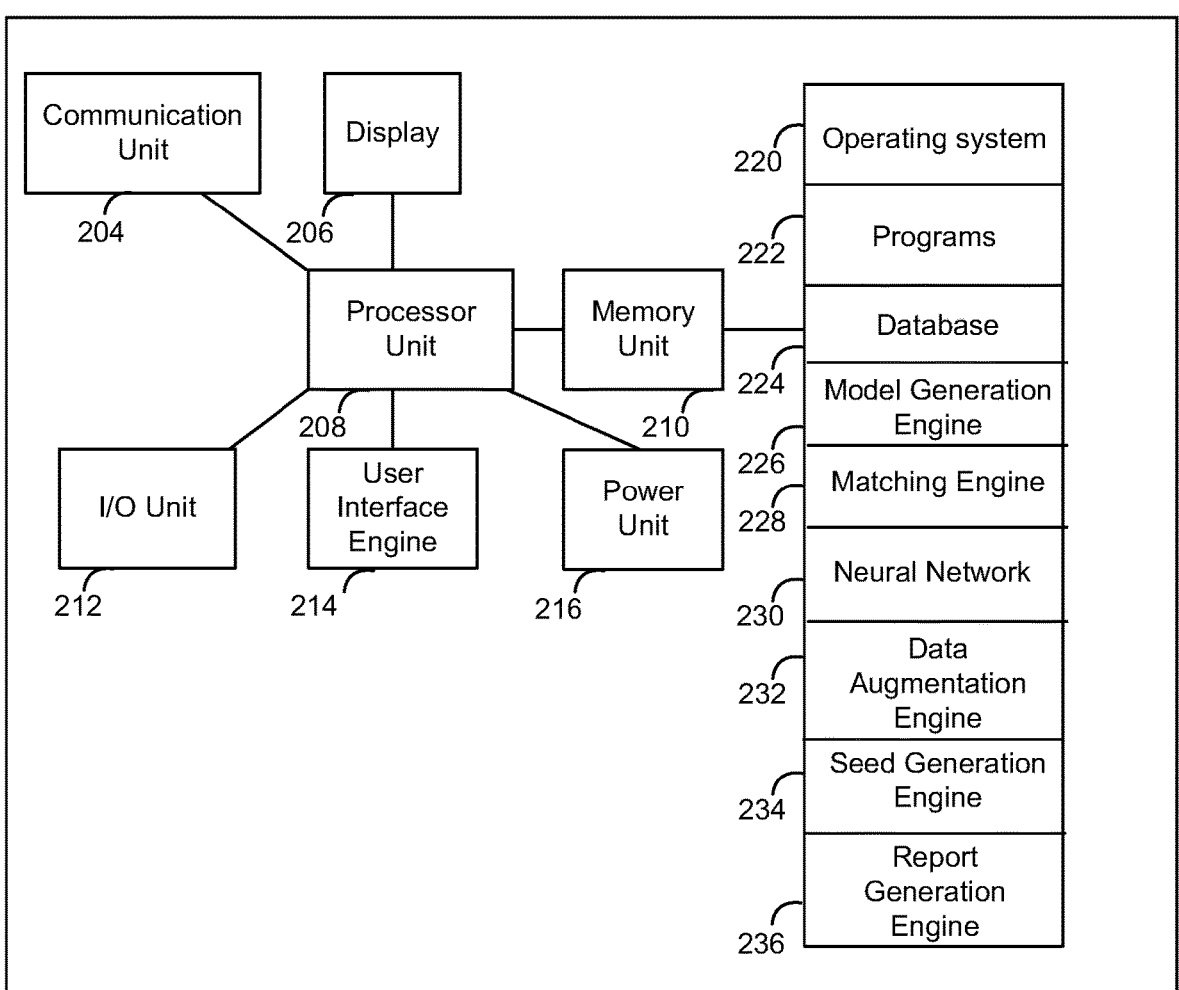
Figure 2B:
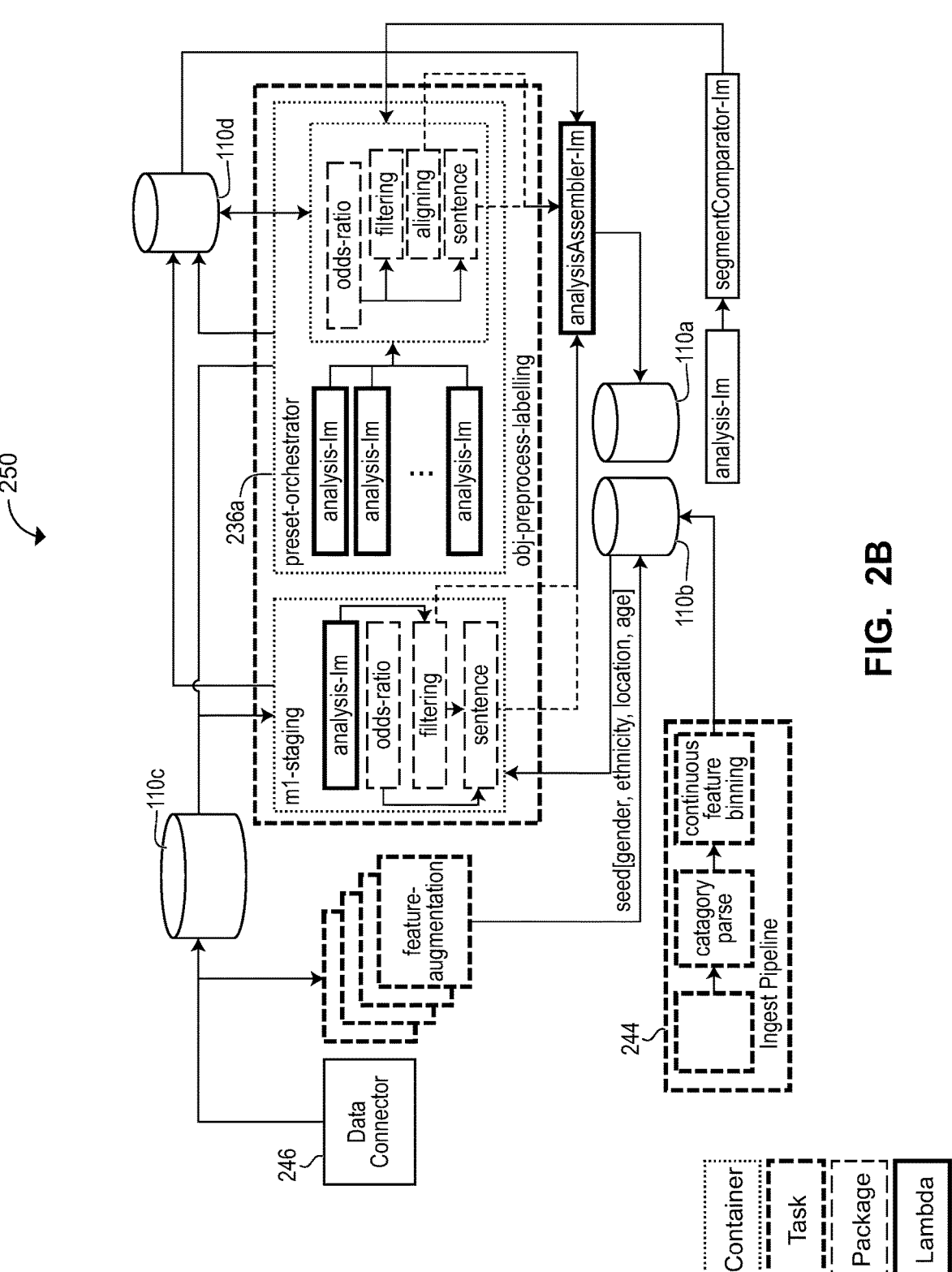
FIG. 2B is an architecture diagram for data ingestion and augmentation by a server in accordance with one or more embodiments.

Reference is next made to FIGS. 2A and 2B. FIG. 2A shows a block diagram for a server 106 in accordance with one or more embodiments. The server 106 of the data augmentation service 108 includes a communication unit 204, a processor unit 208, a memory unit 210, I/O unit 212, a user interface engine 214, and a power unit 216. The server 106 includes a display 206, which may also be a user input device such as a capacitive touch sensor integrated with the screen. The server 106 and the database 110 of FIG. 1A may be provided separately at the data augmentation service 108, or may be provided together as shown. FIG. 2B shows an architecture diagram 250 for data ingestion and augmenta-tion by server 106 in accordance with one or more embodi-ments.

The processor unit 208 controls the operation of the server 106. The processor unit 108 can be any suitable processor, controller or digital signal processor that can provide suffi-cient processing power depending on the configuration, purposes and requirements of the server 106 as is known by those skilled in the art. For example, the processor unit 208 may be a high-performance general processor. In alternative embodiments, the processor unit 208 can include more than one processor with each processor being configured to perform different dedicated tasks. In alternative embodi-ments, it may be possible to use specialized hardware to provide some of the functions provided by the processor unit 208. For example, the processor unit 208 may include a standard processor, such as an Intel® processor, or an AMD® processor.

The communication unit 204 can include wired or wire-less connection capabilities. The communication unit 204 can be used by the server 106 to communicate with other devices or computers. For example, the server 106 may use the communication unit 204 to communicate via network 104 with the user device 102 or the 3rd party data source 112 or the primary user data source 114.

The processor unit 208 can also execute a user interface engine 214 that is used to generate various user interfaces. The user interface engine 214 can be configured to provide user interfaces for receiving the candidate data item for augmentation and to display reports generated based on the augmented candidate data item, for example, FIGS. 5A and 5B.

The display 206 may be an LED or LCD based display and may be a touch sensitive user input device that supports gestures. The I/O unit 212 can include at least one of a mouse, a keyboard, a touch screen, a thumbwheel, a track-pad, a track-ball, a card-reader, voice recognition software and the like again depending on the particular implementa-tion of the server 106. In some cases, some of these components can be integrated with one another. In some embodiments, the display 206 may display reports generated based on the augmented candidate data item.

The power unit 216 can be any suitable power source that provides power to the server 106 such as a power adaptor or a rechargeable battery pack depending on the implementa-tion of the server 106 as is known by those skilled in the art.

The memory unit 210 comprises software code for imple-menting an operating system 220, programs 222, database 224, model generation engine 226, matching engine 228, neural network 230, data augmentation engine 232, seed generation engine 234 and report generation engine 236.

The memory unit 210 can include RAM, ROM, one or more hard drives, one or more flash drives or some other suitable data storage elements such as disk drives, etc. The memory unit 210 is used to store an operating system 220 and programs 222 as is commonly known by those skilled in the art. For instance, the operating system 220 provides various basic operational processes for the server 106. For example, the operating system 220 may be an operating system such as Windows® Server operating system, or Red Hat® Enterprise Linux (RHEL) operating system, or another operating system.

The programs 222 include various programs so that the server 106 can perform various functions such as, but not limited to, receiving the second data set and the first data set, receiving the candidate data item of the second data set, and generating reports based on the augmented candidate data item.

Database 224 may be databases 110 (see FIG. 1A), and may store data including the first data set, the second data set, augmented data, matching seeds, and other data as described herein. The database 224 may include a Structured Query Language (SQL) database such as PostgreSQL or MySQL or a not only SQL (NoSQL) database such as MongoDB, or Graph Databases, etc. The database 224 may run on the server 106 as shown, or may also run indepen-dently on a database server in network communication with the server 106. In some cases, the second data set may not be stored in database 224 and instead a candidate data item in the second data set may be received and augmented.

The model generation engine 226 may generate a data augmentation model based on the first data set. In some embodiments, the first data set may be survey data stored in databases 110. The data augmentation model can be con-figured to generate a data feature for one or more user entries of the first data set. In some embodiments, the data aug-mentation model may be a machine learning model. The machine learning model may be, for example, a neural network comprising an embedding layer and one or more hidden layers.

The model generation engine 226 may store the data augmentation model in database 224 or in databases 110. In some embodiments, the server 106 may transmit the data augmentation model to a remote data augmentation service via network 104.

In some embodiments, an ancillary model generation engine (not shown) in memory 210 may generate an ancil-lary data model based on the first data set received from 3rd party data source 112. The generated ancillary data model can be operated to predict ancillary data corresponding to a user. The ancillary data model may include a first ancillary data model for predicting gender and a second ancillary data model for predicting ethnicity. For example, the ancillary data model can be configured to receive a user's first name, last name and location as inputs and predict demographic attributes such as gender and ethnicity data of the user.

The seed generation engine 234 may generate seed entries corresponding to the users in the first data set. Each seed entry may correspond to one or more user features of the corresponding user. For example, the seed generation engine 234 may generate seed entries corresponding to gender, ethnicity and location of the corresponding user. In some embodiments, the seed generation engine 234 may generate the seed entries by generating an identifier comprising a hash value from the one or more user features of the corresponding user. For example, the seed generation engine 234 can generate an identifier comprising a hash value from the gender, ethnicity and location of the corresponding user.

In some embodiments, the seed generation engine 234 may sort the first data set, based on the seed entries, into categories. For example, if the seed generation engine 234 generated the seed entries corresponding to gender and ethnicity of the corresponding users, the categories may comprise different combinations of gender and ethnicity.

In some embodiments, the seed generation engine 234 may assign the seed entries to data features, of corresponding users, based on the data augmentation model. For example, for a data augmentation model comprising the neural network 300 shown in FIG. 3, the seed generation engine 234 may assign the seed entries to embedding vectors corresponding to the FSA of the corresponding user.

The seed generation engine 234 may store the seed entries in database 224 or in databases 110 or in memory. In some embodiments, the server 106 may transmit the seed entries to a remote data augmentation service via network 104.

The seed generation engine 234 may generate a candidate seed corresponding to a received candidate data item. The candidate seed can be generated based on the corresponding primary user data in the candidate data item. In some embodiments, the candidate seed may be generated based on the ancillary data, generated by the ancillary data model, for the candidate data item. For example, the seed generation engine 234 may generate a candidate seed based on location data in the candidate data item, and gender and ethnicity data generated by the ancillary data model. The seed generation engine 234 can generate an identifier for the candidate seed comprising a hash value from the gender, ethnicity and location data. In some embodiments, the seed generation engine 234 may determine a data feature, for the candidate seed, based on the data augmentation model. For example, for a data augmentation model comprising the neural network 300 shown in FIG. 3, the seed generation engine 234 may determine an embedding vector corresponding to the FSA included in location data corresponding to the candidate data item.

The matching engine 228 may generate one or more matching seeds, for a candidate seed, from among the seed entries generated by the seed generation engine 234 corresponding to the users in the first data set. The matching seeds may be generated based on the data feature for the candidate seed, determined by the seed generation engine 234 based on the data augmentation model. For example, the matching seeds may be generated based on the embedding vector for the candidate seed.

The matching engine 228 can generate a matching score for each seed entry indicating matching between the seed entry and the candidate seed. If the matching score for a seed entry is above a threshold score, the seed entry can be associated with the candidate seed as a matching seed. The matching engine 228 can store the association in a seed match database, for example, a seed match database included in database 224 or in databases 100 or in memory. In some embodiments, the matching engine 228 may store the association in a seed match database included in database 224.

For example, the ancillary user data may comprise gender and ethnicity data and the first data set may be sorted into categories comprising different combinations of gender and ethnicity. Hamming distance may be calculated between the gender and ethnicity category corresponding to the candidate data item and the gender and ethnicity category corresponding to the seed entry. In this example, a smaller hamming distance indicates a closer match between the gender and ethnicity attributes of the candidate data item and the user data corresponding to the seed entry.

Figure 3:
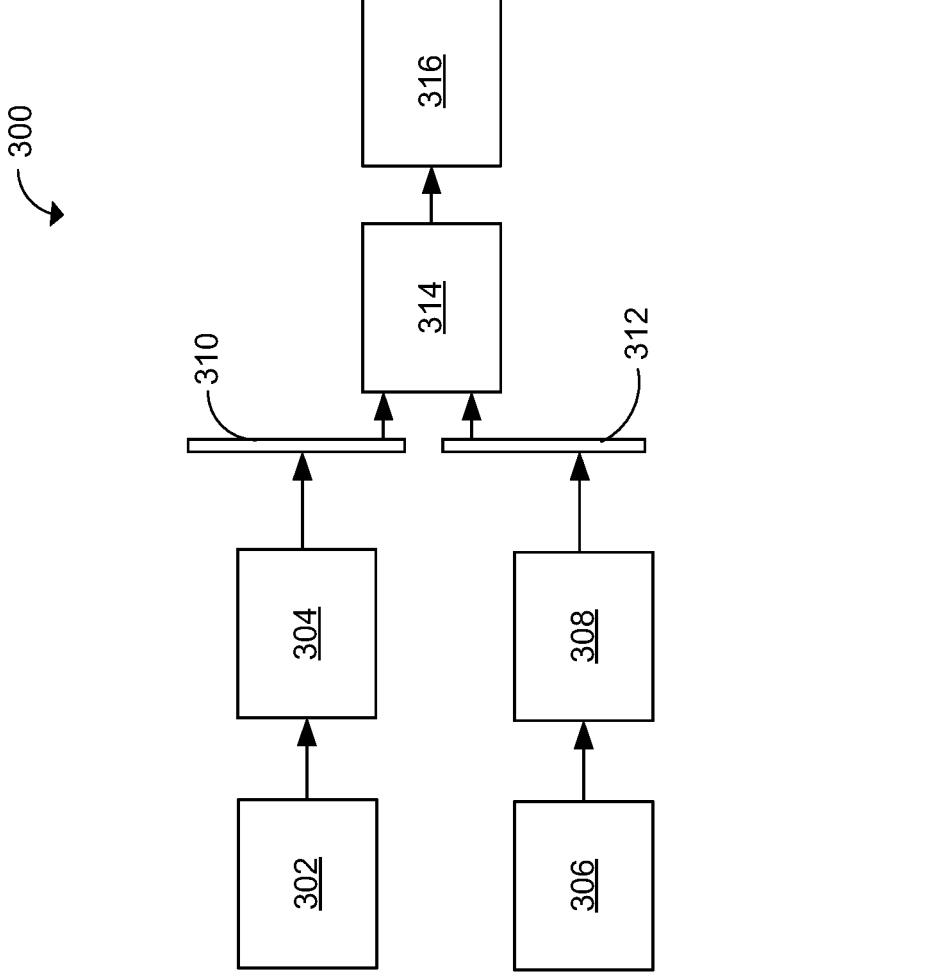
FIG. 3 is a schematic diagram of a neural network in accordance with one or more embodiments.

The neural network 230 may include one or more models, including the data augmentation model in FIG. 3, the first ancillary model, and the second ancillary data model.

The data augmentation engine 232 may augment the candidate data item with data corresponding to one or more matching seeds generated by the matching engine 228. The data augmentation engine 232 may augment a feature value associated with a candidate data item with a weighted distribution of feature values corresponding to the matching seeds. The corresponding feature values (for e.g., indicating make of the car) for the matching seeds may be 1-hot encoded. A weighted distribution of the 1-hot encoded results may be used to augment the corresponding feature value for the candidate data item.

The data augmentation engine 232 may use one or more ancillary data models to determine gender and ethnicity information for a candidate data item.

The report generation engine 236 may generate one or more reports based on the augmented data.

Referring to the data connector architecture diagram 250 shown in FIG. 2B, primary user data which may include customer datasets associated with a user or storefront may be provided by a primary user data source (for example, Shopify®) via Data Connector 246. The received customer datasets may be stored in intermediate database 110c. The received customer datasets may be augmented using an ancillary data model and stored in the Amazon® Relational Database Service 110b. A first data set comprising demographic data may be received at ingest pipeline 244. The ingest pipeline 244 may include category parsing and continuous feature binning of the received data and the processed data may be stored in the Amazon® Relational Database Service 110b.

Reference is now made to FIG. 3, showing a schematic diagram of a neural network 300 in accordance with one or more embodiments for augmenting a candidate data item in a second data set. The neural network 300 comprises a first input layer 302, a second input layer 306, one or more hidden layers 304 and an embedding layer 308. The neural network 300 may correspond to neural network 230 (see FIG. 2A).

The first input layer 302 receives demographic attributes for the candidate data item. The demographic information may be candidate user data from the candidate data item in the second data set, or may be determined using an ancillary data model. The first input layer 302 may receive a seed corresponding to the candidate data item from the seed generation engine (see e.g., FIG. 2A at 234) referred to as the candidate seed.

The one or more hidden layers 304 may receive demographic attributes corresponding to candidate user data of the second data set from the input layer 302. The hidden layers 304 may determine a vector representation 310 corresponding to the demographic attributes received at the first input layer 302. For example, the hidden layers 304 may receive demographic attributes from the first input layer 302 comprising age, ethnicity, education and income and may determine a four-dimensional vector 310 corresponding to the age, ethnicity, education and income.

The second input layer 306 may receive location attributes from a candidate data item. The location information may be a forward sort address for the candidate data item, for example, a postal code or a zip code.

The embedding layer 308 can be configured to receive location attribute 306 corresponding to candidate data, such as user data of the primary second data set. The embedding layer 308 may determine an embedding vector 312 corresponding to the location attribute 306. For example, the embedding layer 308 may receive location attribute 306 comprising a FSA and determine a four-dimensional embedding vector 312 corresponding to the FSA. The neural network 300 may generate a dot product 314 of the demographic vector 310 and the embedding vector 312. Further, the neural network 300 may provide an output 316 based on the dot product 314. For example, the neural network 300 may provide an output 316 that a user with demographic attributes 302 lives in location attribute 306 if the dot product 314 is positive. The neural network 300 can provide an output 316 that a user with demographic attributes 302 does not live in location attribute 306 if the dot product 314 is negative. The output 316 may be one or more nearest neighbors, and corresponding matching score (such as a probability) of the candidate data item matching the nearest neighbors. This matching may be based one (or more than one in combination) of cosine distance between the corresponding embedding vectors and hamming distance between corresponding categorical attributes (gender and ethnicity).

The matching score for a seed entry may be based on i) hamming distance between the ancillary user data of the candidate data item and corresponding ancillary user data for the seed entry, and ii) cosine distance between the data features corresponding to the candidate seed and the seed entry.

In some embodiments, the data feature may include an embedding vector, for example, embedding vector 312 corresponding to neural network 300. The matching score for the seed entry may be based on the cosine distance between embedding vector corresponding to the candidate seed and embedding vector corresponding to the seed entry. The neural network 300 can provide an output 316 that a user with demographic attributes 302 lives in location attribute 306. Accordingly, in this example, a smaller cosine distance between the embedding vectors 312 corresponding to the candidate seed and the seed entry indicates a closer match between the demographic attributes of the candidate data item and the user data corresponding to the seed entry.

The matching nearest neighbors may be stored in database 224 (see FIG. 2A) in associate with the candidate seed.

Figures 4A, 4B, 4C:
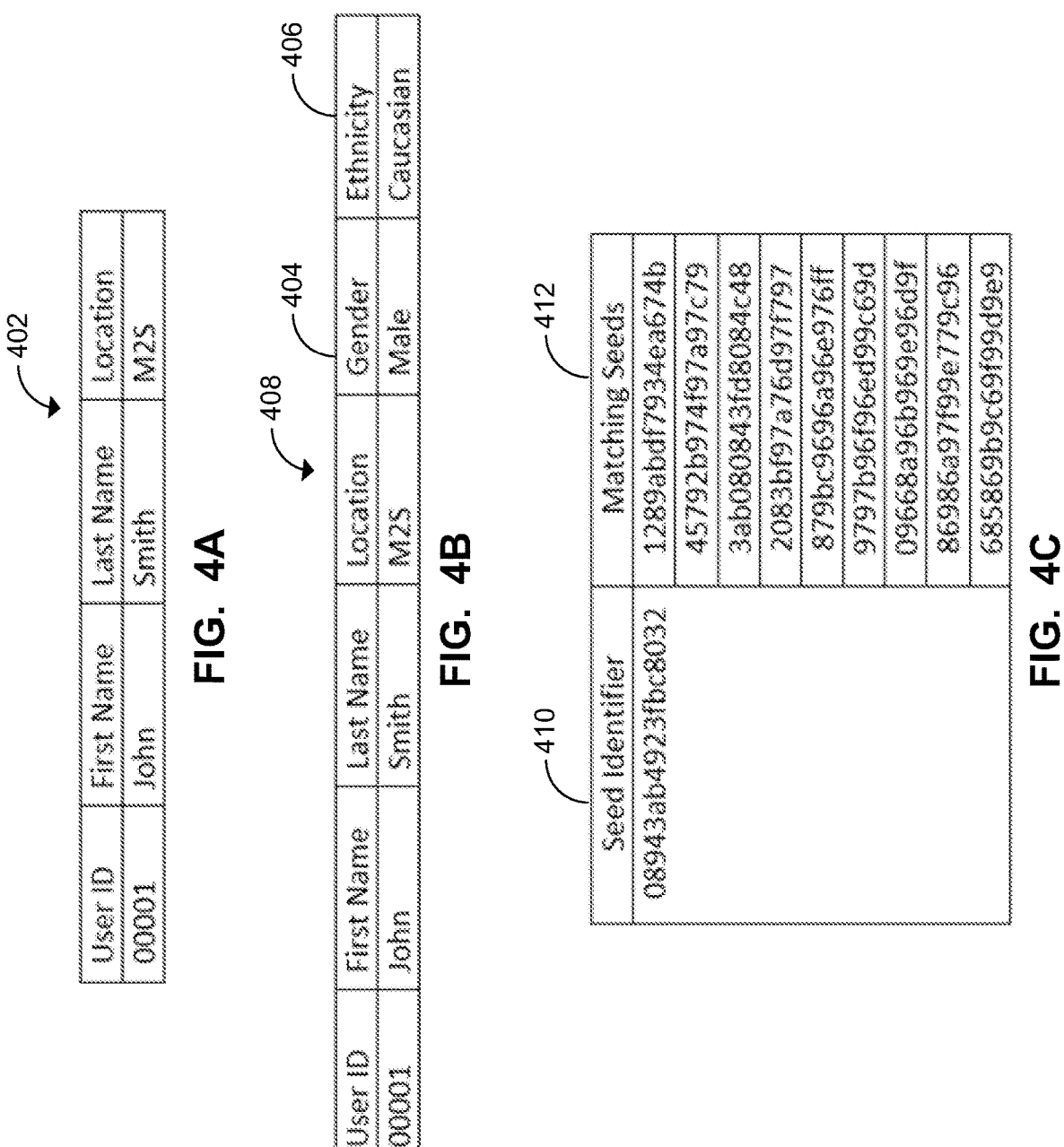
FIG. 4A is a table diagram showing a candidate data item in accordance with one or more embodiments.
FIG. 4B is a table diagram showing an updated candidate data item including predicted gender and ethnicity data for the candidate data item of FIG. 4A in accordance with one or more embodiments.
FIG. 4C is a table diagram showing matching seeds in accordance with one or more embodiments.

Reference is now made to FIG. 4A showing an example candidate data item 402 in accordance with one or more embodiments. The candidate data item 402 includes user ID, first name, last name and location data of a customer in the second data set. The ancillary data model can predict gender and ethnicity data for the candidate data item 402 based on the corresponding first name, last name and location data.

The first name field and last name field may be string fields. The location field may be a string field, or may alternatively be an identifier corresponding to a table containing a plurality of FSA values.

Reference is now made to FIG. 4B showing updated candidate data item 408 including predicted gender and ethnicity data for the candidate data item 402 in accordance with one or more embodiments. The ancillary data model can predict gender data 404 and ethnicity data 406 for the candidate data item 402. The model generation engine 226 may store the ancillary model in database 224 or in databases 110. In some embodiments, the server 106 may transmit the ancillary model to a remote data augmentation service via network 104.

Reference is now made to FIG. 4C showing matching seeds 412 generated for the updated candidate data item 408, in accordance with one or more embodiments. The matching seeds 412 may be represented by identifiers comprising a hash value from at least one user feature of the corresponding user. The candidate data item may be represented by a seed identifier 410 comprising a hash value from at least one user feature of the candidate data item. The matching engine 228 can, for example, store the association between seed identifier 410 and matching seeds 412 in a seed match database included in database 224 or in databases 100.

A seed may be a hash value of a gender, ethnicity and a location (FSA). Seed generation may be deterministic and every same combination of inputs may yield the same seed.

Seed (unique combination of gender, ethnicity, location) matches for augmentation of candidate data items may be extended using embeddings in the case there are no exact matches based on the unique combination of gender, ethnicity and location, or very few matches.

Once a seed matches has been determined using distance measures, a count of corresponding features for all matching seeds may be associated with the candidate seed.

Reference is now made to FIG. 4D showing user data 414 of the first data set corresponding to the matching seeds 412. The user data 414 may include survey data, for example, survey response data regarding make and color of user's car.

Reference is now made to FIG. 4E showing augmented data 416, in accordance with one or more embodiments. One or more user features (418a, 418b) corresponding to the user data 414 of matching seeds 412 may be stored in association with seed identifier 410 of the candidate data item. The matching engine 228 can, for example, store the association between seed identifier 410 and user features 418a, 418b in database 224 or in databases 100. The data augmentation engine 232 may augment the candidate data item with data based on a weighted distribution of the corresponding feature values 418a, 418b.

Figure 5A:
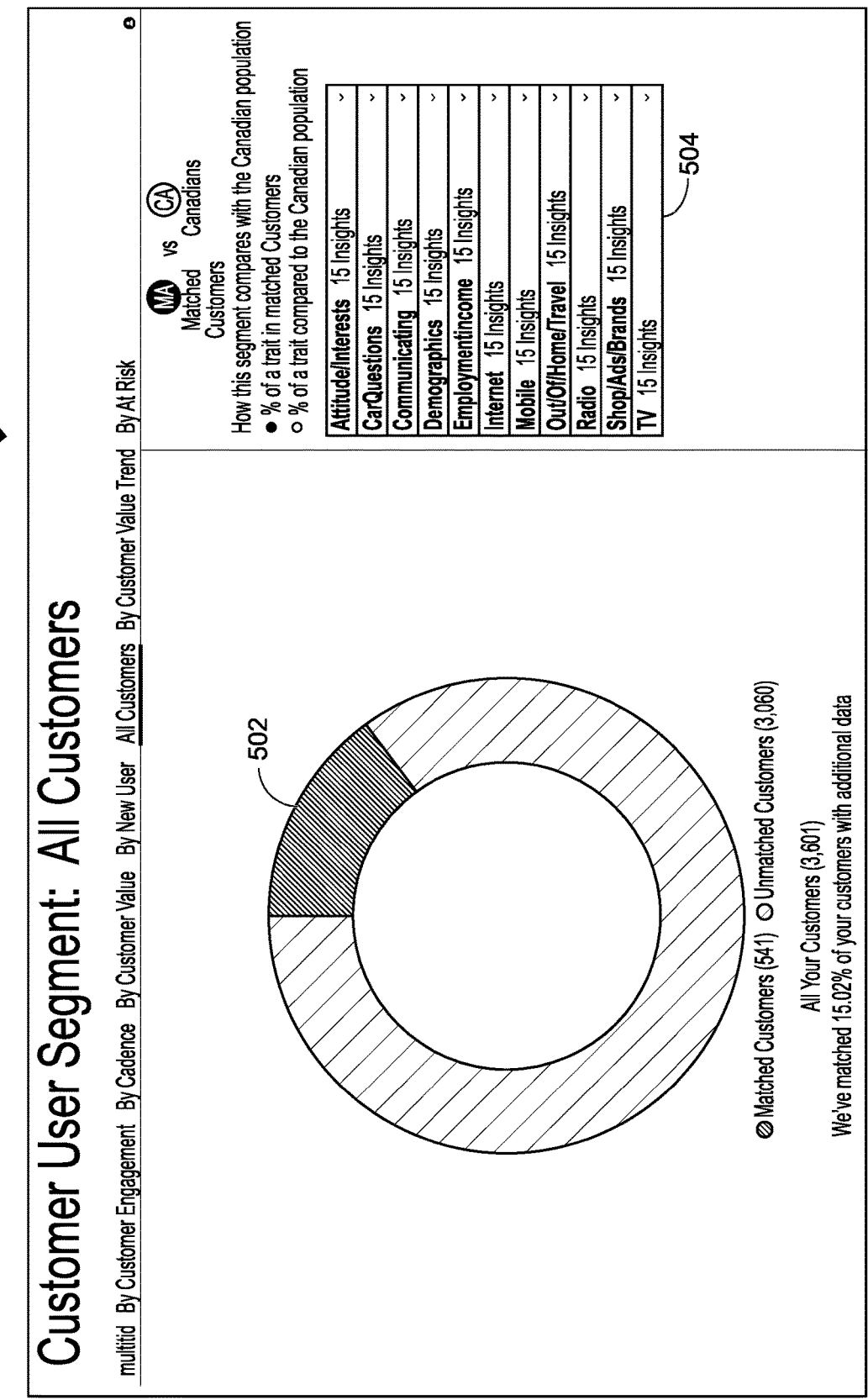
FIG. 5A is a diagram showing a generated report in accordance with one or more embodiments.

Reference is now made to FIG. 5A showing a generated report 500 in accordance with one or more embodiments. The report generation engine 236 may generate report 500 showing a comparison of a customer in a second data set against users in the first data set across one or more associated features. Report 500 may show that more than one customer 502 in a second data set are matched to one or more seed entries in the first data set. The augmented data for matched customers 502 can be used to calculate occurrence count of a feature and perform chit tests to evaluate associations between the matched customers 502 and all users in the first data set. Report 500 can show the results of the calculated associations for one or more features 504.

Figure 5B:
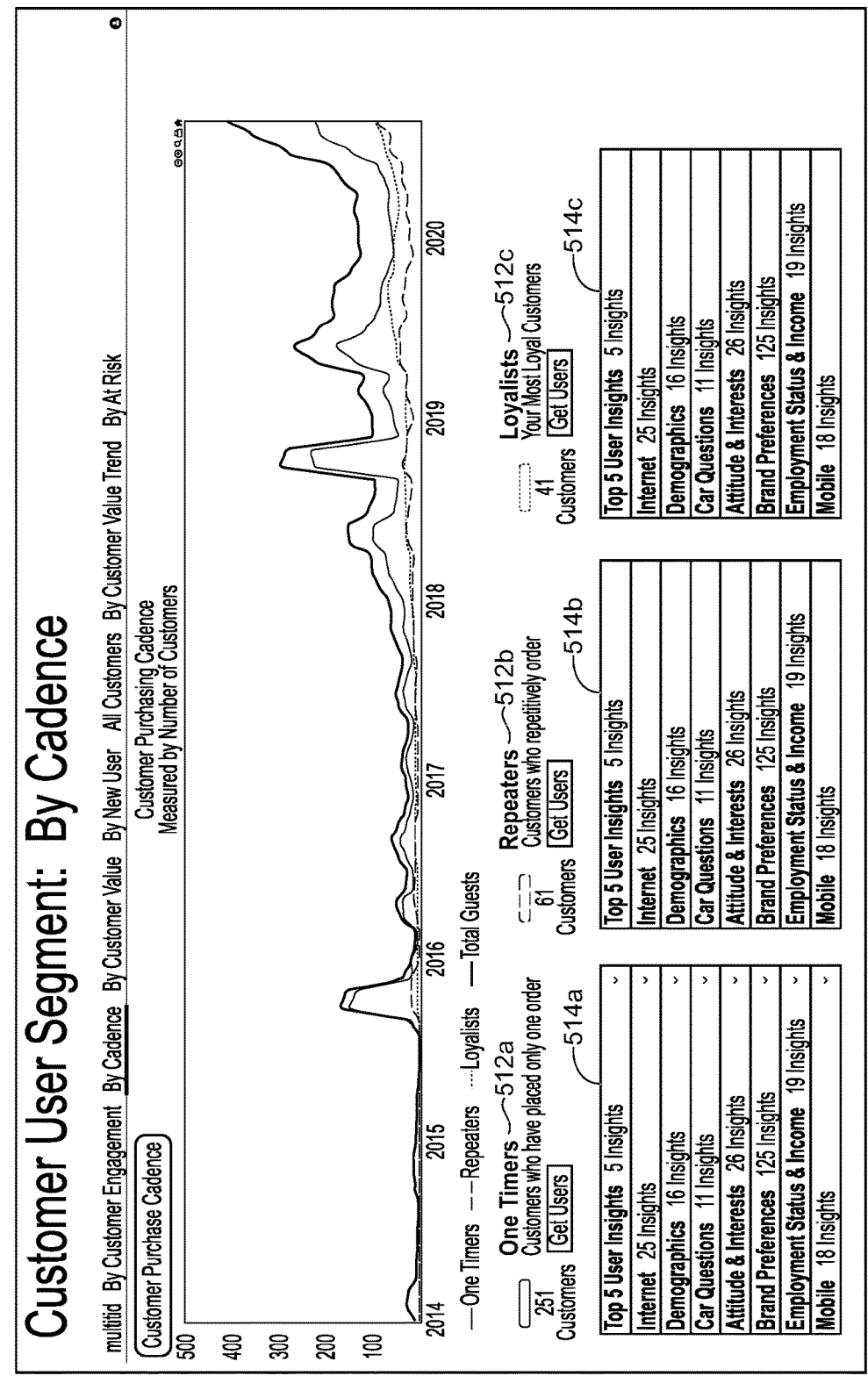
FIG. 5B is a diagram showing a generated report in accordance with one or more embodiments.

Reference is now made to FIG. 5B showing a generated report 510 in accordance with one or more embodiments. The report generation engine 236 may generate report 510 showing a customer purchasing cadence for customer segments generated by analyzing customer user transaction behavior. For example, report 510 shows customer purchasing cadence for three customer segments—"One Timers" 512a, "Repeaters" 512b and "Loyalists" 512c. In some embodiments, the report 510 may be generated by preset orchestrator 236a of FIG. 2B based on augmented customer data. The preset orchestrator 236a can use a $chi^2$ test to identify describable features for a given segment. Report 510 may show describable features 514a, 514b, and 514c for the corresponding customer segments. In some embodiments, the preset orchestrator 236a may perform unsupervised Kmodes clustering on features associated with demographic data to identity unique groupings of users and generate corresponding segments. For the generated segments, the preset orchestrator 236a can use the chi$^2$ test to identify distinguishing features within a segment compared with other segments.

Referring next to FIG. 6, there is shown a method diagram 600 for data augmentation in accordance with one or more embodiments. In some embodiments, method 600 may be performed by data augmentation service 108 shown in FIG. 1.

At 605, the method 600 includes receiving a data augmentation model and a plurality of seed entries, the data augmentation model and the plurality of seed entries generated based on a first data set. The data augmentation model may be generated by, for example, model generation engine 226 based on a first data set. The seed entries may be generated by, for example, seed generation engine 234 based on a first data set.

At 610, the method 600 includes receiving a candidate data item in a second data set, the candidate data item comprising primary user data. FIG. 1B, for example, shows a data connector architecture diagram 120 for receiving a candidate data item comprising customer data from a user or storefront of Shopify® 114a. The candidate data item may correspond to a customer in the second data set and may include primary user data, for example, first name, last name and location.

At 615, the method 600 includes generating a candidate seed corresponding to the candidate data item based on the primary user data. The seed generation engine 234 can, for example, generate a candidate seed corresponding to a received candidate data item. The candidate seed can be generated based on the corresponding primary user data in the candidate data item from the second data set. In some embodiments, the method 600 may include generating the candidate seed based on ancillary data generated by an ancillary data model. This may include generating gender information based on a first ancillary model, and ethnicity information based on a second ancillary model. For example, the seed generation engine 234 may generate a candidate seed based on location data in the candidate data item from the second data set, and gender and ethnicity data generated by the ancillary data model (including a first ancillary data model and a second ancillary data model). The generated gender and ethnicity features may be combined with the location (FSA) from the candidate data item to generate a candidate seed.

At 620, the method 600 includes determining a data feature based on the data augmentation model for the candidate seed. The seed generation engine 234 can, for example, determine a data feature, for the candidate seed, based on the data augmentation model. For the exemplary data augmentation model comprising the neural network 300 shown in FIG. 3, the seed generation engine 234 may determine an embedding vector corresponding to the FSA included in location data corresponding to the candidate data item.

The generated seed may belong to a finite set based on combinations of gender, ethnicity, and FSA. For example, there may be 8 predicted ethnicities, 2 predicted genders, and 1620 FSAs used, providing a finite seed set of 25,920.

The finite set of seeds based on combinations of gender, ethnicity, and FSA may be stored in an augmented seed table in database 110b (see FIG. 1B) which may contain the corresponding hash keys. Each seed may be stored with corresponding features, first name, last name, gender, ethnicity, FSA, etc. The features stored for each seed in the augmented seed table may be determined from the first data set using a matching algorithm to identify corresponding matches based on distance.

Feature values may be answers from the first data set that are matching and may further include counts of survey responses as shown in FIG. 4E.

At 625, the method 600 includes generating at least one matching seed in the plurality of seed entries, the at least one matching seed based on the data feature. The matching engine 228 may, for example, generate matching seeds based on an embedding vector for the candidate seed. The method 600 may include generating a matching score for each seed entry indicating matching between the seed entry and the candidate seed. If the matching score for a seed entry is above a threshold score, the seed entry can be associated with the candidate seed as a matching seed.

At 630, the method 600 includes augmenting the candidate data item with data corresponding to the at least one matching seed from the first data set. The data augmentation engine 234 may, for example, augment a feature value associated with a candidate data item with a weighted distribution of feature values corresponding to the matching seeds. The corresponding feature values (indicating make of the car) for the matching seeds may be 1-hot encoded. A weighted distribution of the 1-hot encoded results may be used to augment the corresponding feature value for the candidate data item.

At 635, the method 600 includes storing an association between the candidate seed and the at least one matching seed in a seed match database. The matching engine 228 can, for example, store the association in a seed match database included in database 224 or in databases 100.

Optionally, the method 600 may further include: receiving an ancillary data model; generating ancillary user data for the candidate data item based on the primary user data and the ancillary data model; and generating the candidate seed further based on the ancillary user data.

Optionally, in method 600, the primary user data comprises at least one selected from the group of a first name, a last name and location data; and the ancillary user data comprises at least one selected from the group of ethnicity data and gender data.

Optionally, the method 600 may further include generating one or more reports based on the augmented candidate data item.

Optionally, in method 600, the at least one matching seed in the plurality of seed entries is generated based on: a hamming distance between the ancillary user data of the candidate data item and ancillary user data for the plurality of seed entries; and a cosine distance between the generated data feature and the data features for the plurality of seed entries.

Optionally, in method 600, augmenting the candidate data item further comprises augmenting the candidate data item with a weighted distribution of data corresponding to the at least one matching seed in the plurality of seed entries.

Optionally, in method 600, the plurality of seed entries further comprises one or more of user behavior data and survey data.

Optionally, in method 600, the data augmentation model comprises a neural network and the data feature comprises an embedding vector.

Optionally, in method 600, generating the at least one matching seed comprises determining matching scores for the plurality of seed entries and applying a threshold score to generate the at least one matching seed.

FIG. 7 is a method diagram 700 for generating a data augmentation model and a plurality of seed entries in accordance with one or more embodiments. In some embodiments, method 700 may be performed by data augmentation service 108 shown in FIG. 1.

At 705, the method 700 includes receiving a first data set comprising demographic data of a first set of users. The demographic data may be provided, for example, by ingest pipeline 244 of FIG. 2B.

At 710, the method 700 includes generating a plurality of seed entries corresponding to the first set of users in the first data set, each seed entry of the plurality of seed entries corresponding to at least one user feature of a user. The seed generation engine 234 may, for example, generate seed entries corresponding to gender, ethnicity and location of the corresponding user. In some embodiments, the method 700 may include generating the seed entries by generating an identifier comprising a hash value from the one or more user features of the corresponding user. The seed generation engine 234 can, for example, generate an identifier comprising a hash value from the gender, ethnicity and location of the corresponding user.

At 715, the method 700 includes generating an ancillary data model for predicting at least one ancillary data item for a user, the ancillary data item comprising a gender and an ethnicity. The model generation engine 226 may, for example, generate an ancillary data model configured to receive a user's first name, last name and location as inputs and predict gender and ethnicity data of the user.

At 720, the method 700 includes sorting the first data set based on the plurality of seed entries into at least two categories, the at least two categories comprising a combination of the gender and the ethnicity. For example, if the seed generation engine 234 generated the seed entries corresponding to gender and ethnicity of the corresponding users, the categories may comprise different combinations of gender and ethnicity.

At 725, the method 700 includes generating a data augmentation model based on the first data set. The model generation engine 226 may, for example, generate a data augmentation model based on the first data set. The data augmentation model can be configured to generate a data feature for one or more user entries of the first data set. In some embodiments, the data augmentation model may be a machine learning model that includes a neural network comprising an embedding layer and one or more hidden layers.

At 730, the method 700 includes assigning each seed entry in the plurality of seed entries to a data feature based on the data augmentation model. The seed generation engine 234 may, for example, assign the seed entries to data features, of corresponding users, based on the data augmentation model. For the example of the data augmentation model comprising the neural network 300, the seed generation engine 234 may assign the seed entries to embedding vectors corresponding to the FSA of the corresponding user.

Optionally, in method 700, the data augmentation model comprises a neural network having an embedding layer and one or more hidden layers.

Optionally, in method 700, the data feature comprises a embedding vector having two or more dimensions.

Optionally, in method 700, generating the plurality of seed entries comprises generating an identifier comprising a hash value from the at least one user feature of the user.

Optionally, the method 700 may further include storing the data augmentation model, the ancillary model and the plurality of seed entries.

Optionally, the method 700 may further include transmitting the data augmentation model, the ancillary model and the plurality of seed entries.

The present invention has been described here by way of example only. Various modifications and variations may be made to these exemplary embodiments without departing from the spirit and scope of the invention, which is limited only by the appended claims.

We claim:

1. A computer implemented method for improving database functionality using data augmentation, the method comprising:

receiving a data augmentation model, wherein the data augmentation model comprises a machine learning model comprising a neural network, and a plurality of seed entries, wherein the neural network comprises an embedding layer and one or more hidden layers, the data augmentation model and the plurality of seed entries generated based on a first data set, the first data set being based on a first set of users from a first platform;

receiving a candidate data item in a second data set based on a second set of users from a second platform, the candidate data item comprising primary user data from the second set of users, wherein the first set of users and the second set of users share no common members, and wherein no association exists between the first data set and the second data set;

generating a candidate seed corresponding to the candidate data item in the second data set based on the primary user data from the second set of users;

determining a data feature based on the data augmentation model for the candidate seed; generating at least one matching seed by generating a matching score between the data feature of the candidate seed and each seed entry in the plurality of seed entries and applying a threshold score, wherein the matching score is generated by processing vector representations corresponding to the data feature and the seed entry using the data augmentation model, and wherein the vector representations corresponding to the data feature and the seed entry are generated by passing the candidate seed or the seed entry through the embedding layer and the one or more hidden layers of the neural network;

augmenting the candidate data item in the second data set, with data corresponding to the first data set by adding, to the candidate data item, additional information corresponding to the at least one matching seed in the plurality of seed entries generated based on the first data set; and storing an association between the second data set and the first data set in a seed match database.

2. The method of claim 1, further comprising:

receiving an ancillary data model;

generating ancillary user data for the candidate data item in the second data set based on the primary user data from the second set of users and the ancillary data model; and generating the candidate seed further based on the ancillary user data.

3. The method of claim 2 wherein:
the primary user data from the second set of users comprises at least one selected from the group of a first name, a last name and location data; and
the ancillary user data comprises at least one selected from the group of ethnicity data and gender data.

4. The method of claim 2 wherein the at least one matching seed in the plurality of seed entries is generated based on:
a hamming distance between the ancillary user data of the candidate data item in the second data set and ancillary user data for the plurality of seed entries generated based on the first data set; and
a cosine distance between the generated data feature and the data features for the plurality of seed entries.

5. The method of claim 1 further comprising generating one or more reports based on the augmented candidate data item.

6. The method of claim 1 wherein augmenting the candidate data item in the second data set further comprises augmenting the candidate data item in the second data set with a weighted distribution of data corresponding to the at least one matching seed in the plurality of seed entries generated based on the first data set.

7. The method of claim 1 wherein the plurality of seed entries further comprises one or more of user behaviour data and survey data.

8. A system for improving database functionality using data augmentation, the system comprising:
a network device;
a memory comprising:
    a data augmentation model, wherein the data augmentation model comprises a machine learning model comprising a neural network, and a plurality of seed entries, wherein the neural network comprises an embedding layer and one or more hidden layers, the data augmentation model and the plurality of seed entries generated based on a first data set, the first data set being based on a first set of users on a first platform;
a processor in communication with the network device and the memory, the processor configured to:
    receive, via the network device, a candidate data item in a second data set based on a second set of users from a second platform, the candidate data item comprising primary user data from the second set of users, wherein the first set of users and the second set of users share no common members, and wherein no association exists between the first data set and the second data set;
    generate a candidate seed corresponding to the candidate data item in the second data set based on the primary user data from the second set of users;
    determine a data feature, based on the data augmentation model, for the candidate seed; generate at least one matching seed by generating a matching score between the data feature of the candidate seed and each seed entry in the plurality of seed entries and applying a threshold score, wherein the matching score is generated by processing vector representations corresponding to the data feature and the seed entry using the data augmentation model, and wherein the vector representations corresponding to the data feature and the seed entry are generated by passing the candidate seed or the seed entry through the embedding layer and the one or more hidden layers of the neural network;
    augment the candidate data item in the second data set with data corresponding to the first data set by adding, to the candidate data item, additional information corresponding to the at least one matching seed in the plurality of seed entries generated based on the first data set; and
    store, in the memory, an association between the second data set and the first data set in a seed match database.

9. The system of claim 8, wherein the memory further comprises an ancillary data model and the processor is further configured to:
generate ancillary user data for the candidate data item in the second data set based on the primary user data from the second set of users and the ancillary data model; and
generate the candidate seed further based on the ancillary user data.

10. The system of claim 9, wherein:
the primary user data from the second set of users comprises at least one selected from the group of a first name, a last name and location data; and
the ancillary user data comprises at least one selected from the group of ethnicity data and gender data.

11. The system of claim 9, wherein the processor is configured to generate the at least one matching seed in the plurality of seed entries based on:
a hamming distance between the ancillary user data of the candidate data item in the second data set and ancillary user data for the plurality of seed entries generated based on the first data set; and
a cosine distance between the generated data feature and the data features for the plurality of seed entries.

12. The system of claim 8, wherein the processor is further configured to generate one or more reports based on the augmented candidate data item.

13. The system of claim 8, wherein the processor is configured to augment the candidate data item in the second data set with a weighted distribution of data corresponding to the at least one matching seed in the plurality of seed entries generated based on the first data set.

14. The system of claim 8, wherein the plurality of seed entries generated based on the first data set further comprises one or more of user behaviour data and survey data.

15. The system of claim 8, wherein the data augmentation model comprises a neural network and the data feature comprises an embedding vector.

16. A method for generating a data augmentation model and a plurality of seed entries for improving database functionality, the method comprising:
receiving a first data;
generating a plurality of seed entries based on the first data set, the first data set comprising demographic data of a first set of users on a first platform, and each seed entry of the plurality of seed entries corresponding to at least one user feature of a user from the first set of users;
generating an ancillary data model for predicting at least one ancillary data item for a user from the first set of users, the at least one ancillary data item comprising a gender and an ethnicity;
sorting the first data set based on the plurality of seed entries into at least two categories, the at least two categories comprising a combination of the gender and the ethnicity;

generating a data augmentation model based on the first data set, wherein the data augmentation model comprises a machine learning model comprising a neural network having an embedding layer and one or more hidden layers;

assigning each seed entry in the plurality of seed entries based on the first data set to a data feature, the data feature being based on a candidate data item in a second data set based on a second set of users from a second platform, by generating a matching score between the data feature and each seed in the plurality of seed entries and applying a threshold score, wherein the matching score is generated by processing vector representations corresponding to the data feature and the seed entry using the data augmentation model, and wherein the vector representations corresponding to the data feature and the seed entry are generated by passing the candidate seed or the seed entry through the embedding layer and the one or more hidden layers of the neural network, wherein the first set of users and the second set of users share no common members, and wherein no association exists between the first data set and the second data set;

augmenting the candidate data item in the second data set with data corresponding to the first data set by adding, to the candidate data item, additional information corresponding to at least one assigned seed entry in the plurality of seed entries generated based on the first data set; and storing an association between the second data set and the first data set in a seed match database.

17. The method of claim 16, wherein the data feature comprises an embedding vector having two or more dimensions.

18. The method of claim 16, wherein the generating the plurality of seed entries based on the first data set comprises generating an identifier comprising a hash value from the at least one user feature of the user from the first set of users.

19. The method of claim 16 further comprising:

storing the data augmentation model, the ancillary data model, and the plurality of seed entries.

20. The method of claim 16 further comprising:

transmitting the data augmentation model, the ancillary data model and the plurality of seed entries.

* * * * *